Figure 1:
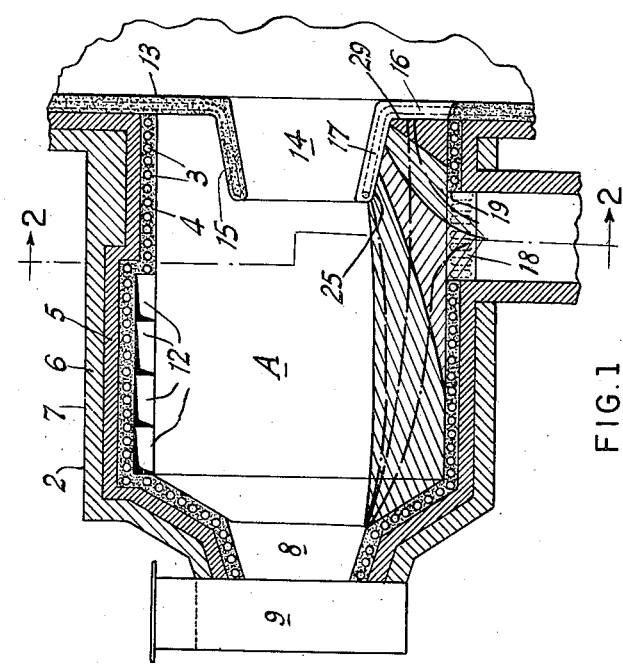

Feb. 11, 1958

A. SIFRIN 2,822,785

FUEL BURNING APPARATUS

Filed Dec. 4, 1952

INVENTOR
*Andreas Sifrin*
BY
*J. P. Moran*
ATTORNEY

United States Patent Office 2,822,785
Patented Feb. 11, 1958

2,822,785

FUEL BURNING APPARATUS

Andreas Sifrin, Oberhausen, Germany, assignor to The Babcock & Wilcox Company, New York, N. Y., a corporation of New Jersey Application December 4, 1952, Serial No. 324,029

Claims priority, application Germany December 8, 1951

5 Claims. (Cl. 122—235)

The present invention relates to fuel burning apparatus and more particularly to furnaces of the cyclone type adapted to burn ash-containing solid fuels in a coarsely pulverized or granular form and under conditions which result in furnace chamber temperatures above the fusing temperature of the ash whereby the residual ash can be removed from the furnace as a liquid slag. The granular fuels normally used in such furnaces have particle sizes of ⅜" and under and, as a result of the fuel crushing operation, contain a proportion of dustlike fine particles. A furnace of this general type is disclosed in U. S. Patent No. 2,594,312.

As customarily constructed, a cyclone type furnace is of circular cylindrical form and horizontally arranged, and comprises a fluid cooled furnace chamber through which the burning fuel and air are caused to move in a substantially helical path along the circumferential wall from a fuel inlet chamber at the outer end toward a central gas outlet passage at the opposite inner end. The fuel to be burned is introduced into the fuel inlet chamber tangentially in a high velocity stream of primary air carrying the solid fuel particles in suspension. The major portion of the combustion air is supplied as preheated secondary air through a tangentially arranged secondary air inlet or port extending longitudinally of the furnace chamber. A stream of preheated tertiary air may also be supplied to the fuel inlet chamber and introduced axially of the primary air-fuel stream.

In the operation of such a furnace the combustible constituents of the fuel burn with a high rate of heat release, and with the development of temperatures above the fusing temperature of the ash, whereby the fuel is rapidly reduced to gaseous products of combustion which are discharged from the furnace through the central gas outlet, and to molten slag which drains through an outlet formed in the rear wall of the chamber at a location vertically below the gas outlet. When the gas outlet is formed by an inwardly projecting throat section of the rear furnace wall, the whirling gas stream is caused to substantially reverse its direction of flow in the annular surrounding pocket before entering the throat. As a result of this flow reversing action, the separation of suspended slag particles from the outgoing gases is facilitated to such an extent that the total quantity of slag retained in the cyclone chamber amounts to about 60%. With fuels of relatively slow-burning properties, a separation of incompletely burned fuel particles is also effected within the pocket. If the flame temperature should not be sufficiently higher than the slag melting temperature these remaining coke particles mix with the discharging molten slag so as to form a viscous mass which clogs the slag outflow opening usually provided in the inner end wall, adjacent the bottom of the furnace. For this reason, it has been proposed to provide a slag outlet in the form of a radial slot extending inwardly and vertically from the circumferential wall of the chamber to the outer circumference of the reentrant gas outlet throat section. However, with adverse slag conditions this modified form of slag outlet is also inadequate.

According to the present invention, there is provided a slag outlet which is formed in the inner end wall as a slot which extends radially and vertically and which is continued through the tapering lower wall portion of the gas outlet throat. Thus, when the cyclone chamber contains slag to a level corresponding to the inner end of the reentrant throat section, the slot is so intensely heated by the discharging gases that the slag entering the slot is maintained molten for discharge from the chamber. Since such an extreme and unfavorable condition is usually of temporary duration the present invention makes it possible to maintain the furnace in operation continuously. Upon the return of more favorable operating conditions, the slag seal along the slot is gradually melted down and normal operating conditions restored.

With the rotational movement of gases within the cyclone chamber, certain fly ash or coke particles are also hurled upwardly and swept along by the gases so as to be discharged through the slot together with a partial stream of the gases. By arranging the slot edges in stepped or overlapping relation, the suspended solids are caused to be discharged with the gases above the slot opening while the molten body of slag continues to discharge through the opening. The same arrangement of edges may be extended with the same effect to the slot in the reentrant throat portion.

The complete closing of the slag outlet slot by slag solidifying therein can be prevented, or at least retarded, and the melting-open accelerated if, in the bottom of the cyclone chamber, there is provided a slag outlet opening which is spaced from the outlet end wall at a clearance distance approximately equal to the axial length of the gas outlet throat section from the wall. For this purpose, the interior end portion of the cyclone chamber may be made truncoconical in such a manner that the bottom slag outlet is positioned at the lowermost point.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Figure 2:
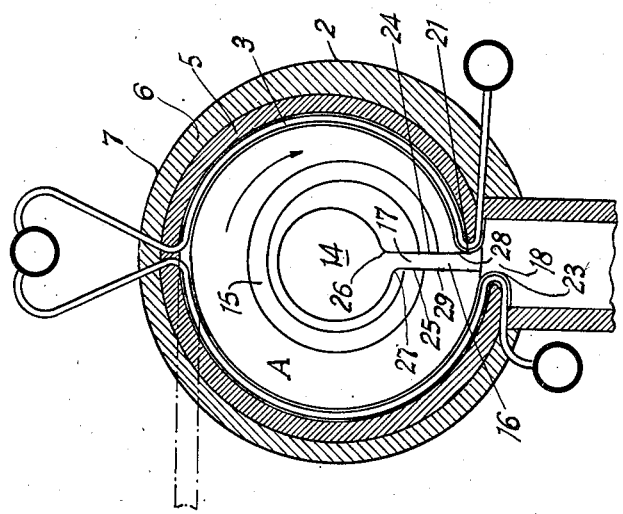

Of the drawings:

Fig. 1 is a sectional elevational view of a cyclone furnace constructed in accordance with the invention; and Fig. 2 is a vertical sectional view of the furnace shown in Fig. 1, as taken along line 2—2.

As illustrated in the drawings, the cyclone furnace is of horizontally elongated cylindrical formation and provides a furnace combustion chamber A of substantially circular cross section about its longitudinal axis, the circumferential boundary wall 2 including a layer of cooling tubes 3 suitably formed with studs, by which an inner layer of heat refractory material 4 is retained to provide a closed wall structure. The tubes 3 are arranged in separate groups at opposite sides of the furnace, as seen in Fig. 2, with the upper and lower ends of the tubes connected to separate headers as shown, suitably for natural circulation of a cooling liquid therethrough. The circumferential boundaries also include two layers 5 and 6 of heat insulating material which is disposed outwardly of tubes 3 and surrounded by an airtight and pressure resistant metal casing or jacket 7. The circumferential walls are conically formed toward the outer end so as to provide a fuel inlet section 8 of reduced diameter into which a stream of primary air and fuel, whirling at high velocity, is introduced from a fuel inlet chamber 9. The fuel to be burned is introduced into the fuel inlet chamber 9 tangentially in a high velocity stream carrying the solid fuel particles in suspension, substantially as disclosed on the aforesaid Patent No. 2,594,312.

Secondary combustion air, which normally constitutes the major proportion of air required for combustion, is introduced tangentially into the main furnace chamber A through nozzle ports 12, in regulable quantity and in the same rotational direction as the fuel. In operation, the stream of furning fuel and air moves in a helical path along and directly adjacent the circumferential wall 2 until it reaches the inner end wall 13 where the whirling gas stream is caused to substantially reverse its axial direction of movement in order to enter the central gas outlet 14 through which the gases are discharged at high axial velocity, suitably for use in heat exchange apparatus. The gas outlet 14 is formed in a reentrant throat section 15 of wall 13, and is of frusto-conical formation to provide a circular gas passage of rearwardly increasing cross section.

In the inner end wall 13 there is formed a vertical slot 16 which extends radially of the wall from the lowermost inner surface portion of cyclone chamber A to the reentrant throat section 15, where the slot is continued through the annular wall of the throat in the form of longitudinal slot 17, in a common vertical plane with slot 16. In the cylindrical chamber wall 2, at the bottom, there is formed a circular opening 18 which serves as a slag outlet and which is so positioned longitudinally of the chamber that its innermost edge 19 is spaced from wall 13 and located below the innermost end of throat 15, in substantially the same vertical plane. The wall cooling tubes 3 in the vicinity of outlet 18, at opposite sides thereof, are formed with U-bend portions, as shown, so that in the circumferential direction of gas flow, as indicated in Fig. 2 by an arrow, the upstream and downstream edge portions of outlet 18 are in stepped or overlapping relation, with the upstream edge portion 21 being positioned at a higher elevation, and lesser radius, than the downstream edge portion 23. Similarly, the upstream and downstream edge portions of the longitudinal slot 17 are in stepped relation, with the bottom inclined upstream edge 24 positioned at a lower elevation, and greater radius, than the bottom inclined downstream edge 25, and with the top inclined upstream edge 26 positioned at a higher elevation, and lesser radius, than the top inclined downstream edge 27. Similarly, the vertical upstream edge 28 of the radial slot 16 is positioned forwardly of the vertical downstream edge 29. With opposite edges of slot 17 in offset or stepped relation, as described, the interior and outer throat surfaces may be formed so as to provide scroll-like contours, as indicated in Fig. 2.

In Fig. 1, the intensity of the hatching indicates the progress of the blocking of slag openings 16 and 18, and the height to which slag may accumulate. The remelting of the slag body proceeds approximately according to the dot-and-dash lines indicating the upper surface formations at successive stages.

While in accordance with the provisions of the statutes I have illustrated and described herein the best form of the invention now known to me, those skilled in the art will understand that changes may be made in the form and arrangement of the apparatus disclosed without departing from the spirit of the invention covered by my claims, including arrangement of the furnace about an axis other than horizontal, and that certain features of my invention may sometimes be used to advantage without a corresponding use of other features.

I claim:

1. A cyclone furnace having a fluid cooled circumferential wall defining a combustion chamber of generally circular cross-section through which a stream of primary air having solid fuel particles in suspension therein is adapted to move rearwardly in a helical path toward the inner end of the chamber, said circumferential wall having a horizontally arranged axis, a fluid cooled wall at said inner end formed with a reentrant fluid cooled annular throat section spaced from said circumferential wall and defining a gas outlet, said end wall having a slag outlet formed in a lower portion thereof adjacent said circumferential wall, and means including tubes associated with said circumferential wall defining a bottom slag outlet in said last named wall having its rearmost marginal portion spaced from said inner end wall at a position of approximate alignment with the gas inlet end of said throat section, said tubes formed with U-bend portions oppositely arranged in planes extending transversely of said axis and defining circumferentially spaced marginal portions of said bottom slag outlet.

2. A cyclone furnace as defined in claim 1 wherein said U-bend portions at the circumferentially upstream margin of said bottom slag outlet are arranged at a lesser radial distance from said axis than the opposing U-bend portions at the circumferentially downstream margin.

3. A cyclone furnace having a circumferential wall defining a combustion chamber of generally circular cross section through which a stream of primary air having solid fuel particles in suspension therein is adapted to travel in a helical path toward one end, and a wall at said end formed with a reentrant annular throat section radially spaced throughout from said circumferential wall and defining a centrally arranged gas outlet, said end wall having a slag outlet therein formed as a slot extending inwardly from said circumferential wall to said throat section, portions of said end wall being circumferentially spaced to form upstream and downstream margins of said slot, said end wall portions being relatively offset longitudinally of the chamber with the circumferentially upstream end wall portion being located longitudinally upstream of the circumferentially downstream end wall portion.

4. A cyclone furnace having a circumferential wall defining a combustion chamber of generally circular cross section through which a stream of primary air having solid fuel particles in suspension therein is adapted to travel in a helical path toward one end, and a wall at said end formed with a reentrant annular throat section radially spaced throughout from said circumferential wall and defining a centrally arranged gas outlet, said end wall having a slag outlet therein formed as a slot extending inwardly from said circumferential wall to said throat section, said slag outlet slot being continued as a longitudinal slot extending longitudinally of and through the annular wall of said throat section, said throat section having wall portions circumferentially spaced to form upstream and downstream margins of said longitudinal slot relative to the rotational movement of the primary air-fuel stream in said helical path, said wall portions which respectively form the upstream and downstream margins of said longitudinal slot being relatively arranged so as to position the circumferentially upstream outer margin radially outward with respect to the opposing downstream outer margin.

5. A cyclone furnace as defined in claim 4 wherein said wall portions which respectively form the upstream and downstream margins of said longitudinal slot are further arranged so as to position the circumferentially upstream inner margin radially inward with respect to the opposing downstream inner margin.

References Cited in the file of this patent

UNITED STATES PATENTS 2,357,301    Bailey et al. _____ Sept. 5, 1944